United States Patent
Radeke

(10) Patent No.: US 11,933,658 B2
(45) Date of Patent: Mar. 19, 2024

(54) METERING UNIT FOR GRANULAR MATERIAL

(71) Applicant: Amazonen-Werke H. Dreyer GmbH & Co. KG, Hasbergen (DE)

(72) Inventor: Jan Philipp Radeke, Bassum (DE)

(73) Assignee: AMAZONEN-WERKE H. DREYER SE & CO. KG (DE)

( * ) Notice: Subject to any disclaimer, the term of this patent is extended or adjusted under 35 U.S.C. 154(b) by 582 days.

(21) Appl. No.: 17/269,028

(22) PCT Filed: Aug. 5, 2019

(86) PCT No.: PCT/EP2019/070969
§ 371 (c)(1),
(2) Date: Feb. 17, 2021

(87) PCT Pub. No.: WO2020/035338
PCT Pub. Date: Feb. 20, 2020

(65) Prior Publication Data
US 2021/0325222 A1    Oct. 21, 2021

(30) Foreign Application Priority Data

Aug. 17, 2018  (DE) .................... 10 2018 120 067.6

(51) Int. Cl.
*A01C 7/12*    (2006.01)
*A01C 7/10*    (2006.01)
(Continued)

(52) U.S. Cl.
CPC ............... *G01F 3/24* (2013.01); *A01C 7/102* (2013.01); *G01F 15/005* (2013.01); *G01F 15/14* (2013.01)

(58) Field of Classification Search
None
See application file for complete search history.

(56) References Cited

U.S. PATENT DOCUMENTS 2,299,565 A * 10/1942 Colburn ............. B65G 53/4616
                                                                222/626
4,408,704 A * 10/1983 Steilen ................... A01C 7/123
                                                                222/312
(Continued)

FOREIGN PATENT DOCUMENTS

DE    20 2014 009 404 U1    3/2016
EP         2832202 A1    2/2015
(Continued)

OTHER PUBLICATIONS

International Search Report for International Patent Application No. PCT/EP2019/070969, dated Nov. 6, 2019.

*Primary Examiner* — Joseph A Dillon, Jr.
(74) *Attorney, Agent, or Firm* — Mintz, Levin, Cohn, Ferris, Glovsky and Popeo, P.C.

(57) ABSTRACT

A metering device for granular material, such as seed or fertilizer, is arranged to deliver the granular material in adjustable quantities, where the metering device includes a metering housing, a drivable metering wheel arranged in the metering housing, and a movable shut-off valve, where the metering housing includes a metering cover that can be moved to different positions and a lock that is associated with the metering cover. The position of the shut-off valve can prevent the lock from being actuated so that the metering cover cannot be opened.

8 Claims, 9 Drawing Sheets

Figure 1:
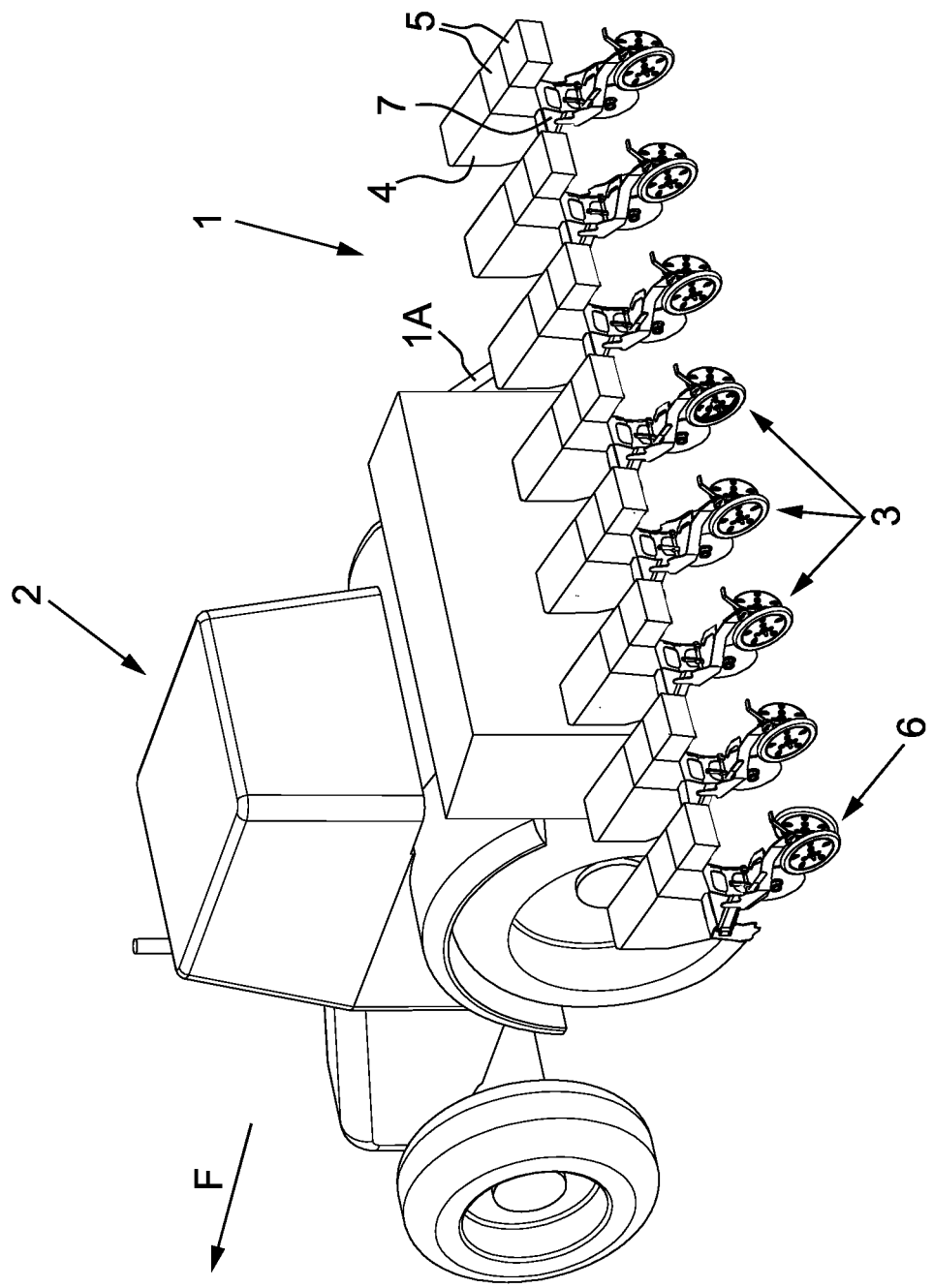

(51) Int. Cl.
*G01F 3/24* (2006.01)
*G01F 15/00* (2006.01)
*G01F 15/14* (2006.01)

(56) References Cited

U.S. PATENT DOCUMENTS

| | | | | |
|---|---|---|---|---|
| 4,928,858 | A * | 5/1990 | Tite | A01C 15/16 222/312 |
| 7,765,943 | B2 * | 8/2010 | Landphair | A01C 7/124 111/178 |
| 8,701,575 | B2 * | 4/2014 | Friggstad | A01C 7/20 111/178 |
| 8,931,424 | B2 * | 1/2015 | Friggstad | A01C 21/00 111/178 |
| 9,591,799 | B2 * | 3/2017 | Henry | A01C 7/102 |
| 10,973,164 | B2 * | 4/2021 | Finlayson | A01C 7/123 |
| 11,252,859 | B2 * | 2/2022 | Hubalek | A01C 7/122 |
| 2010/0307395 | A1 * | 12/2010 | Snipes | A01C 7/102 111/11 |
| 2012/0174844 | A1 | 7/2012 | Friggstad | |
| 2018/0149507 | A1 * | 5/2018 | Kowalchuk | A01C 7/122 |
| 2019/0069473 | A1 * | 3/2019 | Wilhelmi | A01C 19/02 |
| 2019/0191620 | A1 * | 6/2019 | Wendte | A01C 7/046 |
| 2021/0176913 | A1 * | 6/2021 | Radeke | A01C 7/125 |
| 2022/0117149 | A1 * | 4/2022 | Radeke | A01C 7/126 |

FOREIGN PATENT DOCUMENTS

| | | | |
|---|---|---|---|
| EP | 2862431 | A1 | 4/2015 |
| EP | 3053427 | A1 | 8/2016 |

\* cited by examiner

METERING UNIT FOR GRANULAR MATERIAL

The invention relates to a metering device for granular material, a method for opening a metering device, and an agricultural distributor.

A distributor for spreading seed, fertilizer or the like is known from publication EP 2 832 202 B1. This distributor comprises a storage container with a plurality of metering devices for granular material, where a metering device is configured to deliver the granular material in adjustable quantities. For this purpose, the respective metering device comprises a metering housing. A rotatably mounted metering wheel is arranged in the metering housing. During operation, the metering wheel is made to rotate by a drive so that granular material is delivered by way of the metering wheel. In addition, the metering device comprises a shut-off valve which can be moved to various positions. The shut-off valve can be moved to different positions and then opens a desired opening cross-section through which granular material can flow into the metering housing. As a result, the shut-off valve must be opened for operation such that granular material can flow in continuously. Outside of operation, the shut-off valve must be moved such that the opening cross-section is closed in order to prevent the granular material from escaping from the storage container to the metering wheel.

For regular maintenance or adjustment of the metering device, it may be necessary for a user to perform work in the interior of the metering housing. For example, it is conceivable that the user would like to clean the metering housing or replace the metering wheel. The drawback of this metering device is that the interior of the metering housing is almost freely accessible to the user. A particularly negative aspect there is that there is a risk for the user of coming into contact with a driven metering wheel and injuring himself when working on the metering device.

The object underlying the invention is therefore to create a metering device for agricultural distributors with improved handling safety.

According to the invention, this object is satisfied in that the metering housing comprises a metering cover that can be moved to different positions, that the metering cover comprises a first position that protects the metering wheel and a second position that releases the metering wheel, and comprises a nose on the side facing the shut-off valve, that the metering cover is associated with a lock securing the metering cover in the first position, that the lock comprises a locking element that can be pushed away and is configured to establish a releasable, positive-fit connection with the nose of the metering cover in the first position, that the shut-off valve is arranged in the push-away direction of the locking element behind the lock and comprises a receptacle for the locking element, that the shut-off valve is configured by way of the receptacle to enable and/or to block the locking element being pushing away.

As a result of this measure, the metering device is created having two safety levels connected in series, so that the protection for the user during the handling action is increased in an excellent manner. The first safety level is formed by the lock, without the actuation of which the interior of the metering housing is not accessible to the user. This lock is additionally secured by the position of the shut-off valve, which forms the second safety level.

The shut-off valve with its receptacle for the locking element is arranged behind the lock in such a way that the locking element can be moved into the receptacle, in particular by being pushed away. The receptacle on the shut-off valve is arranged in such a way that the locking element can only be moved into the receptacle when the shut-off valve is in its closed position. Once the shut-off valve has been moved to a position that is open at least in part, the receptacle is no longer aligned with the locking element so that the movability of the locking element is blocked. The interior of the metering housing is no longer accessible to the user when the metering device is in operation because the actuation of the lock is already prevented by the open position of the shut-off valve and the metering cover is therefore secured in its first position protecting the metering wheel.

In order to open the metering housing, the shut-off valve must consequently be moved to the closed position so that the movability of the locking element is enabled. The metering device is typically not in operation when the shut-off valve is closed so that it is safe for the user to open the metering cover without coming into contact with the driven metering wheel.

In one advantageous development of the invention, it is provided that the metering cover is arranged on the metering housing by way of a pivot joint having a pivot axis, so that the metering cover can be moved between the first and the second position by way of the pivot joint. It is advantageous there that the metering cover is arranged captively on the metering housing. This means that even when work is performed in the interior of the metering housing, the metering cover is attached to the metering housing and does not have to be stored with particular care or can be damaged if it is dropped.

The metering device according to the invention is also advantageously further developed in that the metering device comprises a device for applying a push-away force upon the locking element. This makes it easier to operate the lock, so that the metering cover can be moved between its positions in a simple manner.

In one advantageous embodiment of the invention, the device for applying the push-away force comprises a tool and an insertion aid on the metering cover corresponding to the tool, where the insertion aid is arranged on the metering cover in such a way that the direct manual application of the push-away force is prevented and the application by way of the tool is facilitated. The metering device is thus created having a further safety level. The insertion aid is preferably arranged directly in front of the locking element so that the locking element is at least in part covered by the insertion aid. The locking element can then not be reached by the user with his fingers so that the lock cannot be actuated by hand. The insertion aid is shaped in such a way that it forms a guide track for the tool in the direction in which the locking element is pushed away. The tool can be a universal tool which is provided for various other functions of the metering device or a distributor. The tool preferably comprises a handle at its rear end and is rod-shaped at its front end.

It is provided in a further advantageous development of the invention that the metering device comprises a removable bearing casing for mounting the metering wheel to be rotatable, that the metering housing comprises a receptacle into which the bearing casing can be inserted, that the receptacle comprises a preferably finger-shaped molding forming an undercut, that the bearing casing comprises a preferably groove-like recess, that the recess is configured to engage behind the molding, and that the bearing casing can thus be releasably affixed to the metering housing by way of the recess and the corresponding molding. It is there advantageous to have the metering device be created with a mount that is particularly easily accessible. Devices for mounting the metering wheel can be preassembled in the bearing casing in a particularly simple manner and the intact bearing casing can then be inserted into the metering housing. The bearing casing is therefore configured for the metering wheel to be mounted in a rotatable manner and easily removable for maintenance.

It is further advantageous to have the bearing casing be affixable to the metering housing without tools. The molding on the receptacle of the metering housing and the recess of the bearing casing form a releasable positive-fit connection based on the principle of a bayonet lock. The bearing casing can be inserted manually into the receptacle and then rotated in such a way that the recess engages behind the molding. The bearing casing can be easily and safely affixed manually at any time.

The metering device according to the invention is advantageously further developed in that the bearing casing comprises a locked position in which the bearing casing is affixed in the axial direction on the metering housing and an unlocked position in which the bearing casing can be removed from the metering housing, where the metering cover comprises a web-shaped shoulder that is preferably formed to be projection-shaped and the shoulder in the first position of the metering cover forms an abutment for the bearing casing and is configured to block a rotary motion of the bearing casing from the locked position to the unlocked position.

As a result of this measure, the metering device is created with a mounting that is particularly easily accessible. Differential torques arising at the bearing casing during operation are absorbed in a simple manner by the bearing casing and diverted to the metering cover. This further development of the metering device according to the invention is consequently characterized by a particularly simple and safe structure.

In a further advantageous development of the invention, the metering housing comprises a first stop for limiting the rotary motion of the bearing casing from the unlocked position to the locked position, where the shoulder in the first position of the metering cover forms a second stop, preferably disposed opposite the first stop, and the bearing casing can be affixed in a rotationally fixed manner on the metering housing between the first and the second stop. The bearing casing is therefore not only affixed in the axial direction on the metering housing, but is also held between the first stop and the second stop in the locking position that is safe for operation. The first stop there advantageously serves to limit the assembly motion of the bearing casing.

As a device for mounting the metering wheel, the bearing casing can comprise at least one bearing shell into which at least one radial bearing can be inserted. Furthermore, the bearing casing can be configured to support a metering shaft. The bearing casing can be configured to accommodate a motor, where the motor is configured to drive the metering wheel.

It is provided in a further advantageous development of the invention that the bearing casing has an at least almost round cross-section, that the recess is formed at least approximately in the shape of a quarter of a circle on the bearing casing, that the receptacle for the bearing casing is formed to be semicircular, that the molding is molded onto the receptacle of the metering housing at least in the shape of an eighth of a circle. It is particularly advantageous in this further development to have the bearing casing be affixable in the metering housing in an extremely simple manner. The round cross-section of the bearing casing and the configuration of the receptacle, the recess and the molding as a segment of a circle prevent the bearing casing from canting when affixed in the metering housing.

The metering device according to the invention is advantageously further developed in that, in the state of the bearing casing being affixed to the metering housing, the recess points from the center axis of the bearing casing radially in the direction to the ground. The bearing casing in its affixed state is created having a self-lock against migrating out of the affixed state. Otherwise, the bearing casing could be stimulated to perform a rotary motion due to rotations during operation of the metering device, which could cancel the it being affixed to the metering housing Such a safety deficiency is appropriately prevented in this further development.

The object underlying the invention is also satisfied by a method of the kind mentioned at the outset, where the method according to the invention comprises closing a shut-off valve, applying a push-away force to a locking element, pressing in the locking element to release a positive-fit connection between the locking element and a nose of a metering cover, and moving the metering cover.

In one advantageous further development of the method according to the invention, the push-away force is applied to the locking element by inserting a tool into an insertion aid on the metering cover and pushing the tool in the direction of the locking element.

The method according to the invention is advantageously further developed in that moving the metering cover comprises pivoting the nose on the metering cover out of the positive-fit connection with the locking element about a pivot axis and pivoting down the metering cover about the pivot axis to a position that releases a metering wheel of the metering device.

The object underlying the invention is also satisfied by an agricultural distributor of the kind mentioned at the outset, where the agricultural distributor comprises at least one storage container for seed, fertilizer or the like, where at least one metering device is associated with the storage container and the metering device is configured according to at least one of the preceding embodiments.

The agricultural distributor can be, for example, a seed drill, preferably a mechanical seeder. Alternatively, the agricultural distributor can be a single grain seeder.

Figure 2:
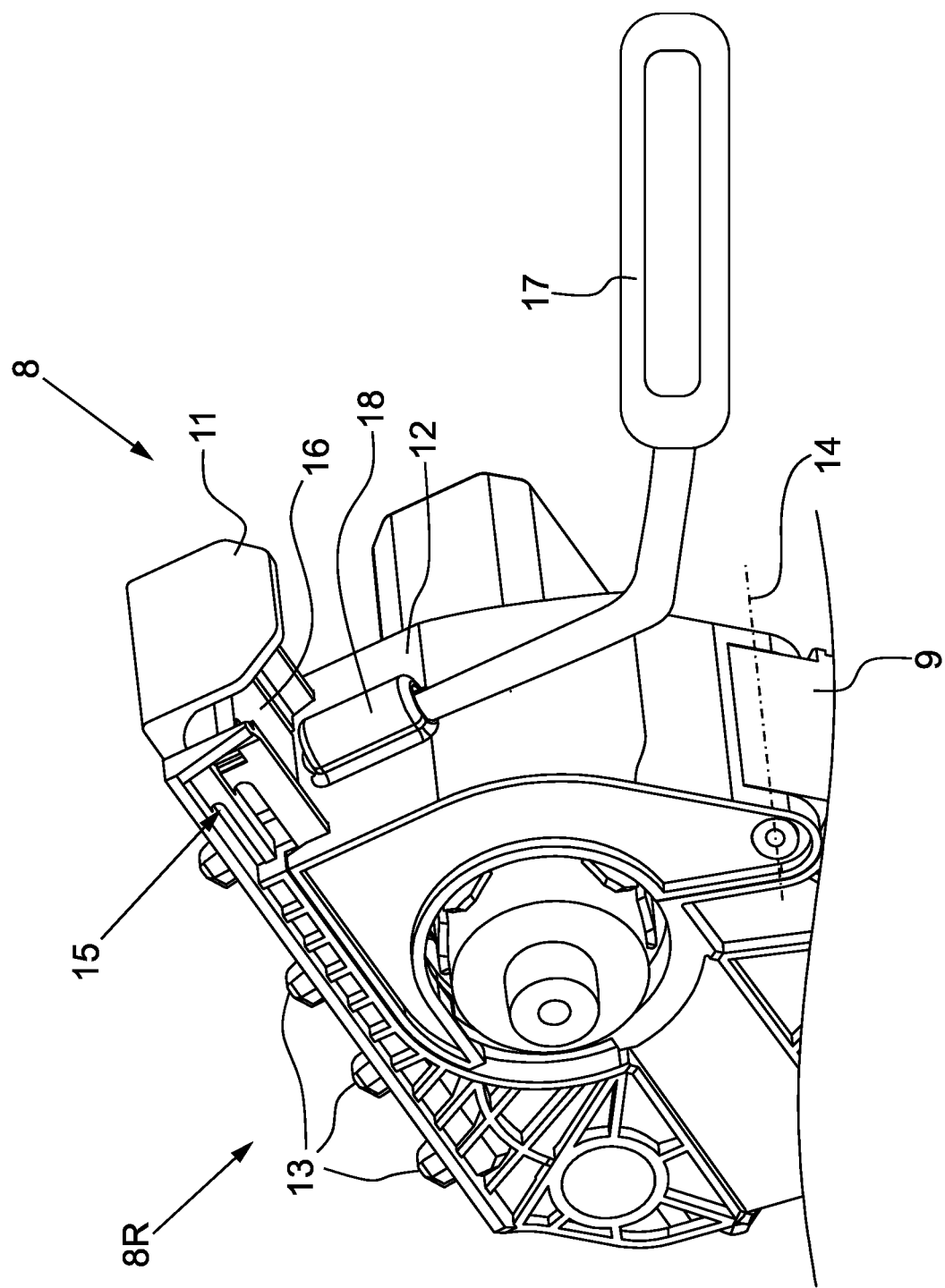
Figure 3:
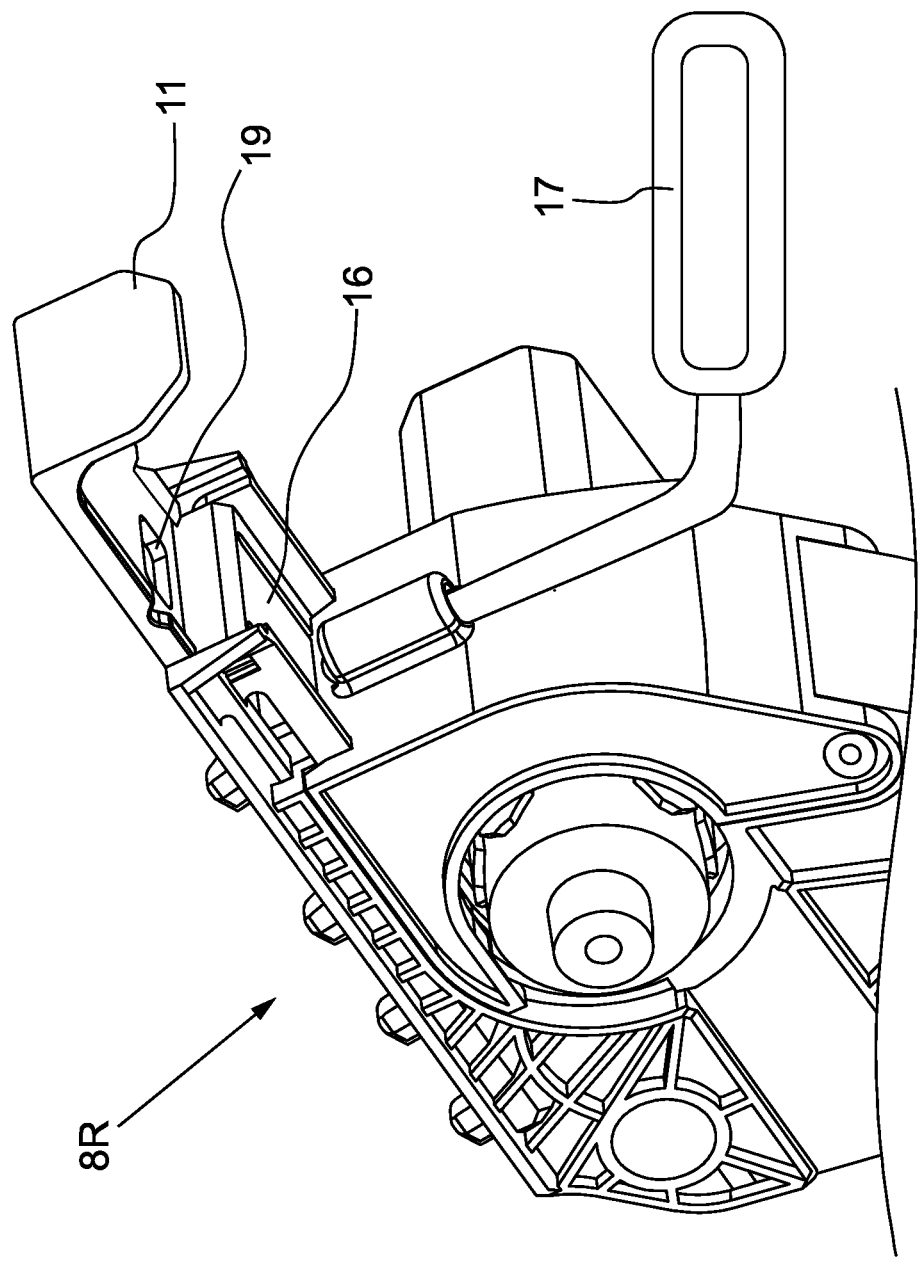
Figure 4:
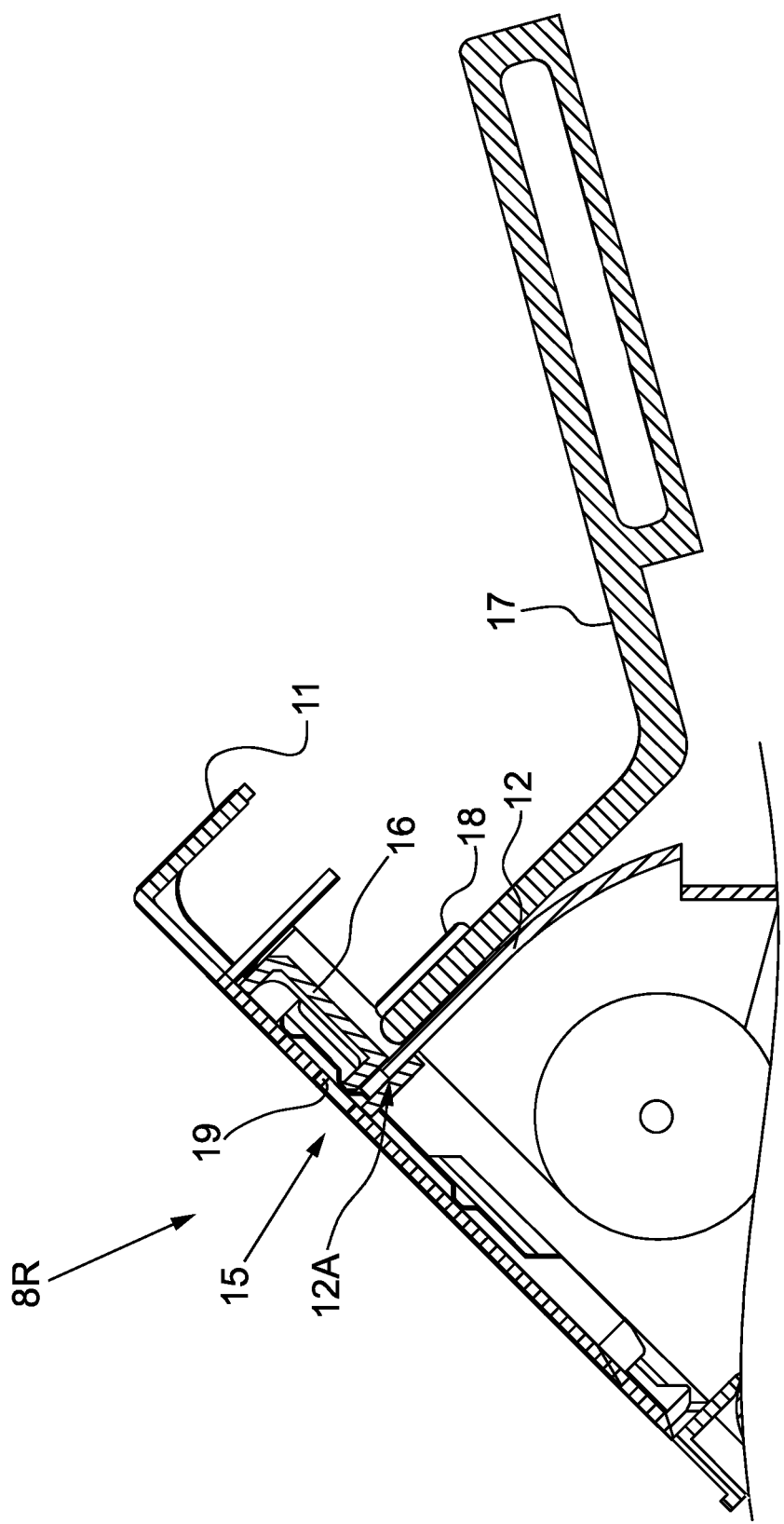
Figure 5:
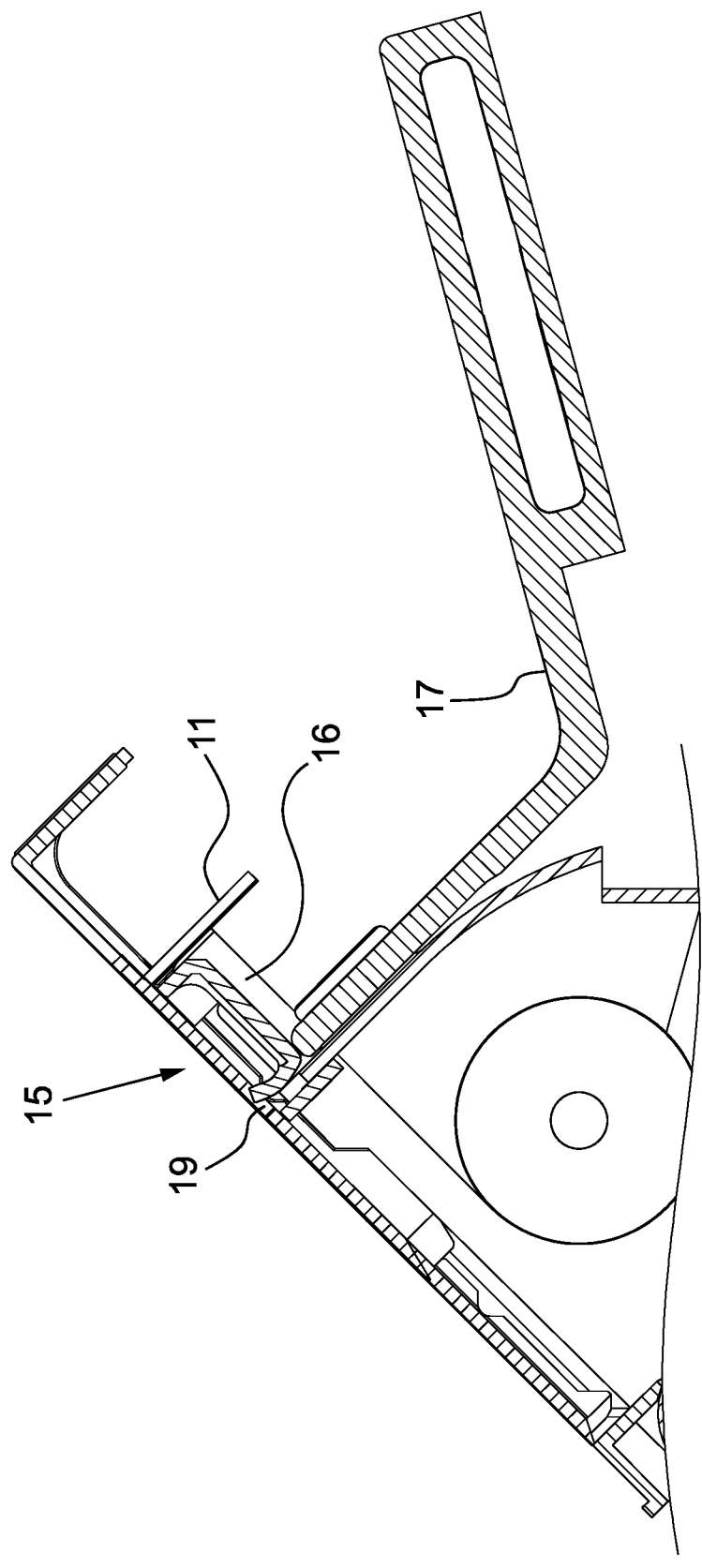

Further details of the invention can be gathered from the description of the examples and the drawings. In these drawings FIG. 1 shows an agricultural distributor attached behind a farming tractor in a perspective view, FIG. 2 shows a metering device according to the invention with a shut-off valve in the closed position in a perspective view, FIG. 3 shows the metering device in a perspective view, where the shut-off valve is in the open position, FIG. 4 shows the metering device with a lock in sectional view and a detailed view, FIG. 5 shows the metering device in a sectional view and a detailed view, where the lock is unlocked.

Figure 6:
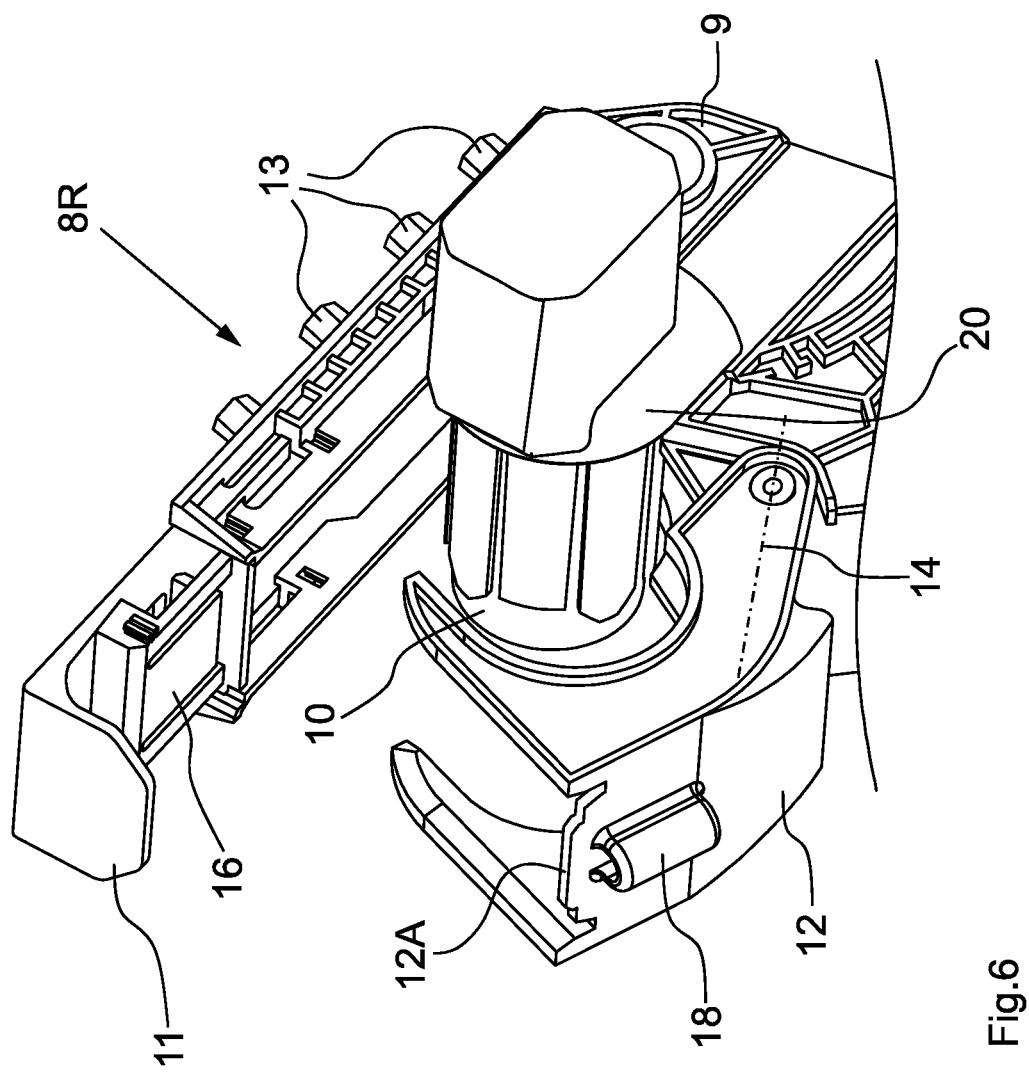
Figure 7:
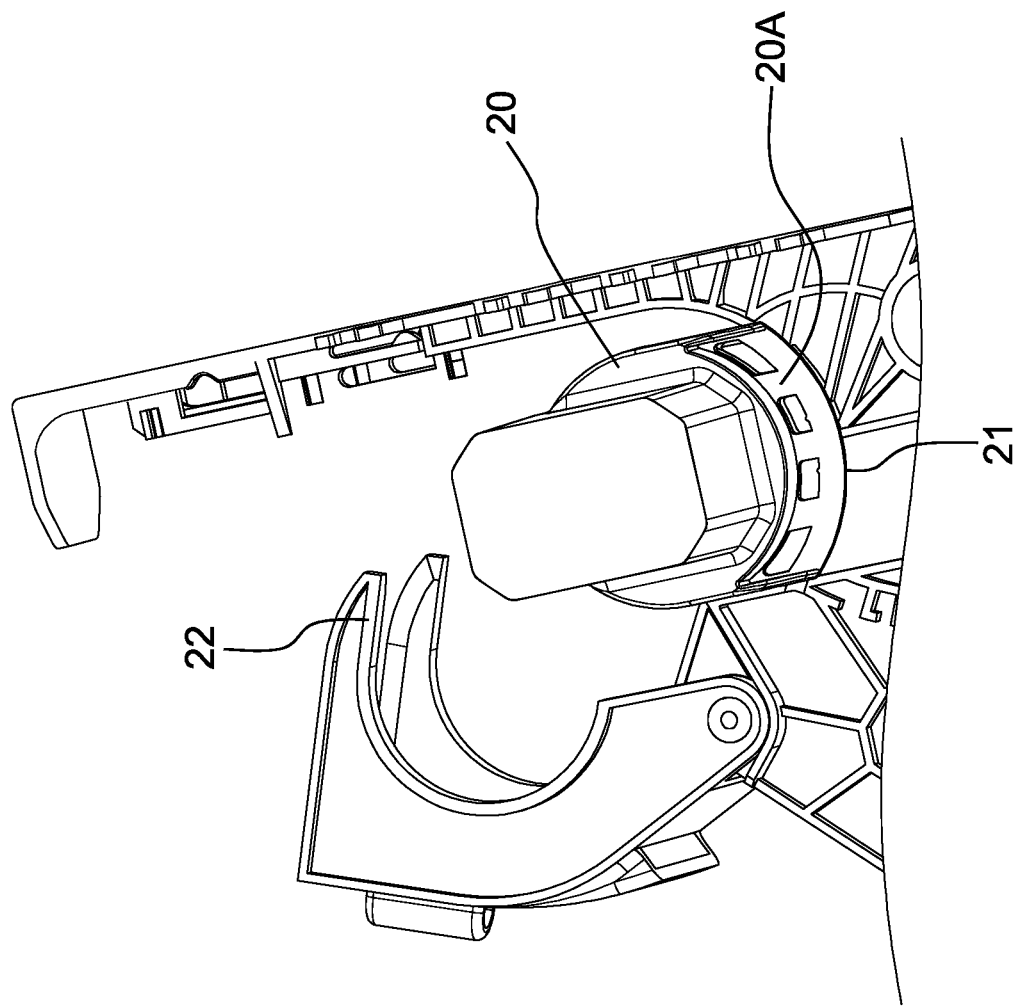
Figure 8:
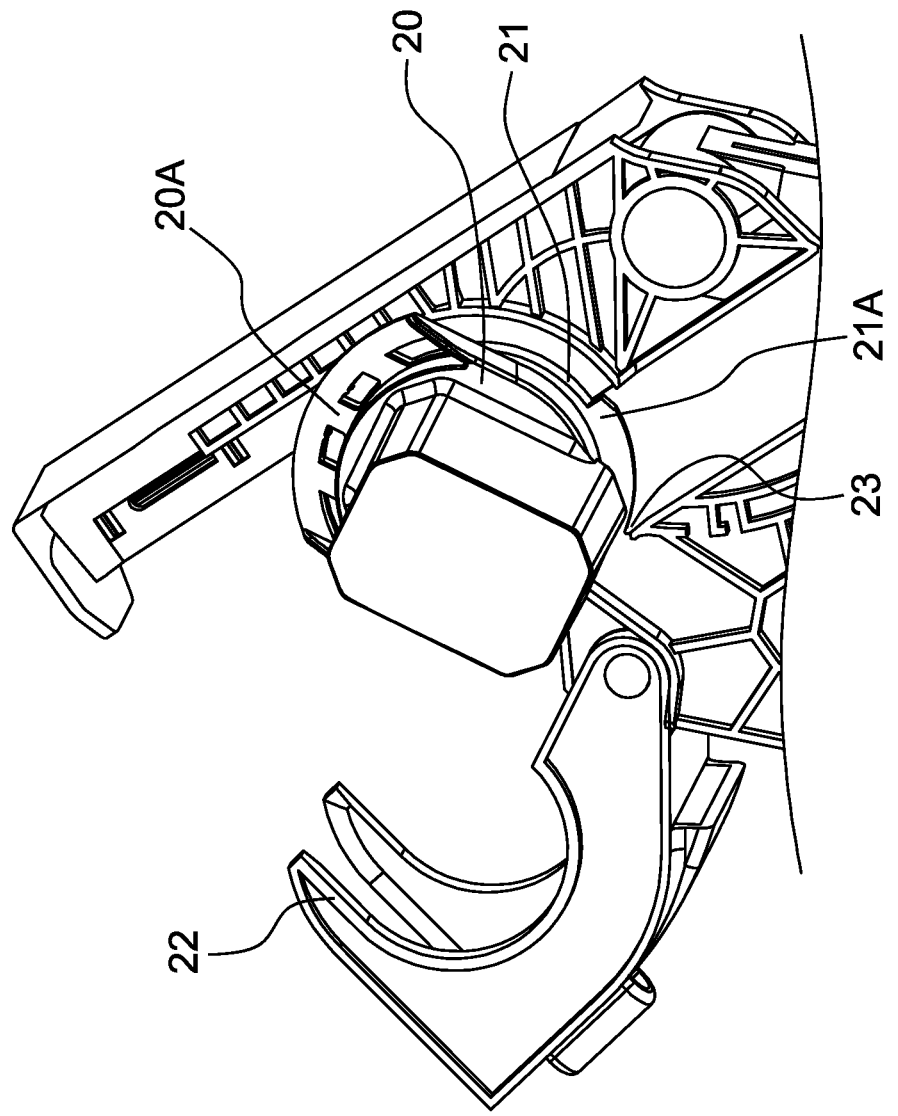
Figure 9:
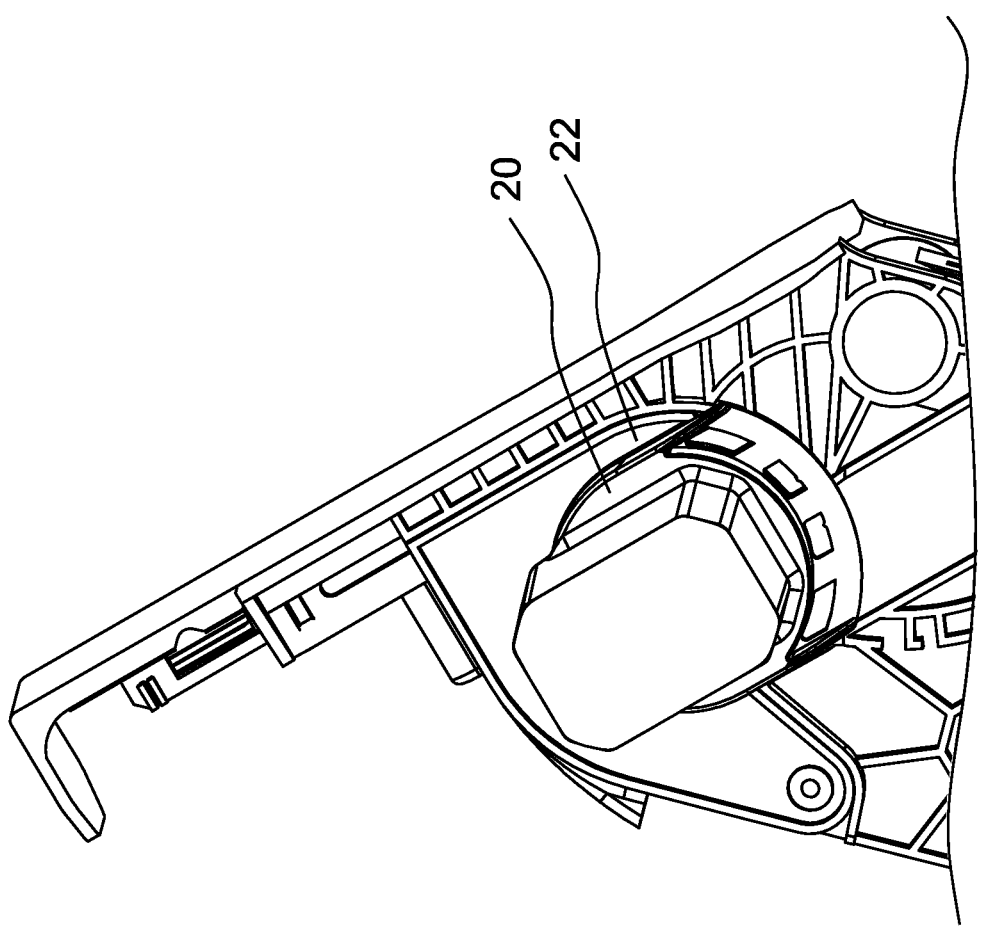

FIG. 6 shows the metering device with a metering cover in the open position in a perspective view, FIG. 7 shows the metering device with a bearing casing in a side view, FIG. 8 shows the metering device in a side view, where the bearing casing is in a removable position, and FIG. 9 shows the metering device in a side view, where the metering cover is in the closed position.

An agricultural distributor configured as a single grain seeder 1 is shown in FIG. 1. Single grain seeder 1 is attached behind a farming tractor 2 so that the two machines move together over a field to be worked during operation in direction of travel F and can spread granular material, such as seed or fertilizer. Single grain seeder 1 comprises at its end that is in direction of travel F at the rear a plurality of sowing assemblies 3 arranged transverse to direction of travel F. Sowing assemblies 3 are attached to frame 1A of single grain seeder 1, where frame 1A can be folded in or telescoped to the permissible total width for road transport.

Sowing assemblies 3 are each attached to frame 1A of single grain seeder 1 by way of a mounting flange. In the upper region, sowing assemblies 3 comprise a first storage container 4, primarily for seed, and two second storage containers 5, primarily for granular material. In the lower region facing the soil, sowing assemblies 3 comprise tillage tools 6. Tillage tools 6 serve to open a sowing furrow and to close it again after seed and granular material have been dispensed thereinto.

Sowing assemblies 3 each comprise a separating device 7 to dispense seed from first storage container 4. Separating device 7 is connected, firstly, to first storage container 4 and, secondly, to tillage tools 6 and configured to dispense separated seed into the sowing furrow. Sowing assemblies 3 each comprise two metering devices 8 for delivering granular material in adjustable quantities. Metering devices 8 are each associated with second storage container 5 and are arranged at an outlet thereof. The granular material delivered by metering devices 8 is also passed to tillage tools 6, where it is worked into the soil.

A metering device 8 according to the invention is shown in a perspective view in FIG. 2. Metering device 8 comprises substantially a metering housing 9, a drivable metering wheel 10 arranged in metering housing 9, a metering cover 12, and a movable shut-off valve 11, presently closed in FIG. 2. Metering housing 9 can be arranged to a second storage container 5 by way of attachment hooks 13 on the former's rear side 8R. Disposed on rear side 8R of metering housing 9 is an inlet, which is presently concealed in FIG. 2, for granular material from second storage container 5. This inlet is covered by shut-off valve 11 when shut-off valve 11 is closed so that no granular material can flow into metering housing 9. Shut-off valve 11 is consequently shown in its closed position in FIG. 2. In order to allow granular material to flow into metering housing 9, shut-off valve 11 can be moved, i.e., opened, as shown in FIG. 3, so that an opening cross section of the inlet into metering housing 9 is opened.

In order to allow a user to do work in the interior of metering housing 9, metering cover 12 can be moved between different positions by way of a pivot joint having a pivot axis 14. Metering cover 12 in FIG. 2 is shown in a first position protecting metering wheel 10, meaning that metering housing 9 is closed. In this first closed position, metering cover 12 is associated with a lock 15 which prevents metering cover 12 from being moved to a second position that releases the metering wheel, as shown in FIG. 6.

Lock 15 comprises a locking element 16 that can be pushed away. Locking element 16 is configured to establish a releasable positive-fit connection based on the principle of a snap connection to metering cover 12 and to thus secure the latter in its first position protecting metering wheel 10. In order to release this positive-fit connection and to thereby open metering housing 9, locking element 16 is to be pushed away in the direction of rear side 8R. For this purpose, metering device 8 comprises a device for applying a push-away force configured as a tool 17 with a corresponding insertion aid 18 being arranged on metering cover 12. Insertion aid 18 forms a linear guide for tool 17 in the direction of actuation of locking element 16 and thereby facilitates the application of the push-away force. In addition, insertion aid 18 is arranged so close in front of locking element 16 that locking element 16 cannot be actuated by hand.

In FIG. 4, lock 15 is shown in detail and in a sectional view. Locking element 16 is in contact with a nose 12A of metering cover 12 and thus forms the positive-fit connection. Nose 12A is latched under locking element 16 in the position shown. Arranged in the direction of rear side 8R behind locking element 16 is shut-off valve 11, presently shown in FIG. 4 in the closed position. Shut-off valve 11 comprises a cut-out 19 for locking element 16. If the pressing force is now applied to locking element 16 byway of tool 17 to release lock 15, then locking element 16 plunges subject to elastic deformation into cut-out 19 of shut-off valve 11, as shown in FIG. 5. The positive-fit connection between locking element 16 and nose 12A of metering cover 12 is then released and metering cover 12 can be pivoted about pivot axis 14 to its second position releasing metering wheel 10, as shown in FIG. 6. For locking element 16 to be able to be pushed away into cut-out 19 on shut-off valve 11, it is necessary that shut-off valve 11 be in its closed position.

FIG. 3 shows shut-off valve 11 in its open position. In this position, cut-out 19 is not disposed in the direction of rear side 8R behind locking element 16. If the user were to apply the push-away force to locking element 16 by way of tool 17 in this open position of shut-off valve 11, then locking element 16 cannot be pushed away subject to elastic deformation and lock 15 can therefore not be released. Shut-off valve 11 is consequently configured by way of cut-out 19 to block locking element 16 from being pushed away to its open position or to enable it in its closed position, as shown inter alia in FIGS. 4 and 5. The arrangement of cut-out 19 on shut-off valve 11 entails that shut-off valve 11 must be closed for lock 15 to be able to be released. Otherwise locking element 16 cannot be received in cut-out 19 and strikes in front of shut-off valve 11 without releasing nose 12A.

It is therefore necessary for the user to first close shut-off valve 11 in order to open metering device 8. The pressing force can then be applied with the aid of tool 17 upon locking element 16. For this purpose, tool 17 is to be inserted into insertion aid 18 and pushed in the direction of locking element 16. As a result, locking element 16 is pressed in and the positive-fit connection between locking element 16 and nose 12A on metering cover 12 is released, so that metering cover 12 can finally be moved. In order to move metering cover 12, nose 12A on metering cover 12 is pivoted out of the positive-fit connection. Metering cover 12 pivots about pivot axis 14 downwardly to its second position, releasing metering wheel 10.

FIG. 6 shows metering device 8 in a perspective view with metering cover 12 open. Shown in the interior of metering housing 9 is metering wheel 10. For mounting metering wheel 10 in a rotatable manner, metering device 8 comprises a removable bearing casing 20 with an almost round cross section. Bearing casing 20 comprises suitable devices for mounting metering wheel 10 and can be inserted into a semicircular receptacle 21 on metering housing 9, as shown in a side view in FIG. 7. In order to affix bearing casing 20 releasably to metering housing 9, bearing casing 20 comprises a groove-like recess 20A on its circumference. This groove-like recess 20A forms a slot and is configured to engage behind a finger-shaped molding 21A in the shape of a quarter of a circle on receptacle 21.

Molding 21A in the shape of approximately an eighth of a circle on receptacle 21 can be seen in FIG. 8, in which bearing casing 20 is shown in an unlocked position that can be removed from metering housing 9. Bearing casing 20 can be removed there for the reason that recess 20A is not in engagement with molding 21A. Recess 21A forms an undercut, so that bearing casing 20 is in a locked position that is affixed in the axial and at least in part in the horizontal direction when recess 20A engages behind molding 21A. This locked position of bearing casing 20 is shown in FIG. 7, where recess 20A engages behind molding 21A unlike in the unlocked position shown in FIG. 8.

In order to insert bearing casing 20 into receptacle 21 and thereby affix it to metering housing 9, meaning to move bearing casing 20 from the unlocked position to the locked position, bearing casing 20 must be inserted into receptacle 21. This means that bearing casing 20 is positioned in receptacle 21 such that recess 20A can engage behind molding 21A. Such positioning of the bearing casing is shown by way of example in FIG. 8. Rotating bearing casing 20 up to a first stop 23 of the bearing casing then results in recess 20A sliding over molding 21A and receiving the latter, thus engaging therebehind, as shown in FIG. 7. In this position of bearing casing 20 affixed on metering housing 9, recess 20A points at least approximately from the central axis of bearing casing 20 radially in the direction toward the ground. To release bearing casing 20 again, bearing casing 20 must be rotated in the opposite direction. This rotation in the opposite direction is blocked in the first position of metering cover 12.

Metering cover 12 has a web-shaped, projection-shaped shoulder 22 which in the first position of metering cover 12 forms an abutment for bearing casing 20, as shown in FIG. 9. This ensures that bearing casing 20 does not turn loose unnoticed and unintentionally. In addition, shoulder 22 therefore forms a torque support for bearing casing 20. Torques absorbed by bearing casing 20 during operation are passed on via shoulder 22 to metering cover 12 and from there via metering housing 9 to surrounding structures. Furthermore, shoulder 22 in the first position of metering cover 12 forms a second stop for bearing casing 20 disposed opposite first stop 23, so that bearing casing 20 is affixed on the metering housing in a rotationally fixed manner between first stop 23 and shoulder 22. If metering cover 12 is open, as shown in FIG. 8, then shoulder 22 does not form any abutment for bearing casing 20, so that the rotation of bearing casing 20 in a direction opposite to the direction in which first stop 23 is disposed is enabled.

LIST OF REFERENCE CHARACTERS 1 single grain seeder
1A frame
2 farming tractor
F direction of travel
3 sowing assembly
4 first storage container
5 second storage container
6 tillage tools
7 separating device
8 metering device
8R rear side
9 metering housing
10 metering wheel
11 shut-off valve
12 metering cover
12A nose
13 attachment hook
14 pivot axis
15 lock
16 locking element
17 tool
18 insertion aid
19 cut-out
20 bearing casing
20A recess
21 receptacle
21A molding
22 shoulder
23 first stop

The invention claimed is:

1. Metering device for granular material for delivering said granular material in adjustable quantities, where said metering device comprises:
a metering housing, a drivable metering wheel arranged in said metering housing, and a movable shut-off valve,
wherein said metering housing comprises a metering cover configured to be moved to different positions,
wherein said metering cover comprises a first position that protects said metering wheel and a second position that releases said metering wheel and comprises a nose on a side facing said shut-off valve,
wherein said metering cover is associated with a lock for securing said metering cover in said first position,
wherein said lock comprises a locking element configured to be pushed away and configured to establish a releasable, positive-fit connection with said nose of said metering cover in said first position,
wherein said shut-off valve is arranged in a push-away direction of said locking element behind said lock and comprises a receptacle for said locking element, and
wherein said shut-off valve is configured by way of said receptacle to enable or to block said locking element being pushed away.

2. The metering device according to claim 1, wherein said metering cover is arranged on said metering housing by way of a pivot joint having a pivot axis, said metering cover configured to be moved between said first position on and said second position by way of said pivot joint.

3. The metering device according to claim 1, wherein said metering device comprises a device for applying a push-away force onto said locking element.

4. The metering device according to claim 3, wherein said device for applying the push-away force comprises a tool and an insertion aid on said metering cover corresponding to said tool, the insertion aid being arranged on said metering cover such that direct manual application of the push-away force is prevented and application of the push-away force by said tool is facilitated.

5. Method for opening a metering device, the metering device including a metering housing and a movable shut-off valve, comprising the steps of:
closing a shut-off valve,
applying a push-away force onto a locking element,
pressing in said locking element to release a positive-fit connection between said locking element and a nose of a metering cover, and
moving said metering cover.

6. The method according to claim 5, wherein the step of applying the push-away force onto said locking element further comprises:

inserting a tool into an insertion aid on said metering cover, and pushing said tool in the direction of said locking element.

7. The method according to claim 5, wherein the step of moving said metering cover further comprises:

pivoting said nose on said metering cover out of said positive-fit connection with said locking element about a pivot axis, and pivoting said metering cover down about said pivot axis to a position that releases a metering wheel of said metering device.

8. Agricultural distributor for spreading seed or fertilizer, wherein said agricultural distributor comprises at least one storage container for the seed or the fertilizer, said storage container being associated with said metering device according to claim 1.

\* \* \* \* \*